United States Patent [19]
Sizemore

[11] Patent Number: 6,050,020
[45] Date of Patent: Apr. 18, 2000

[54] FISHING POLE HOLDER

[76] Inventor: Ricky L. Sizemore, 2340 E. Fillmore, Phoenix, Ariz. 85006

[21] Appl. No.: 09/325,277

[22] Filed: Jun. 3, 1999

[51] Int. Cl.[7] .................................................. A01K 91/10
[52] U.S. Cl. ................................................. 43/15; 43/21.2
[58] Field of Search .................................. 43/15, 16, 21.2; 248/514, 515, 519, 520

[56] References Cited

U.S. PATENT DOCUMENTS

| | | | |
|---|---|---|---|
| 1,877,845 | 9/1932 | Gerline .................................. | 248/514 |
| 2,551,996 | 5/1951 | Cherubini .............................. | 43/15 |
| 2,638,696 | 5/1953 | Derkovitz .............................. | 43/15 |
| 2,964,868 | 12/1960 | Bennett ................................ | 43/15 |
| 3,001,314 | 9/1961 | Nahrstedt .............................. | 43/15 |
| 3,724,971 | 4/1973 | Mason .................................. | 248/514 |
| 4,012,861 | 3/1977 | Gellatly ................................ | 43/15 |
| 4,344,248 | 8/1982 | Brophy, Sr. et al. .................. | 43/15 |
| 4,676,018 | 6/1987 | Kimball ................................ | 43/15 |
| 5,050,332 | 9/1991 | Cross ................................... | 43/15 |
| 5,228,227 | 7/1993 | Hodgson, Sr. ........................ | 43/15 |
| 5,245,778 | 9/1993 | Gallegos et al. ...................... | 43/15 |
| 5,279,064 | 1/1994 | Jaeger ................................. | 43/21.2 |
| 5,345,708 | 9/1994 | Loyd .................................... | 43/21.2 |
| 5,383,298 | 1/1995 | Engel ................................... | 43/15 |
| 5,438,789 | 8/1995 | Emory ................................. | 43/21.2 |
| 5,483,768 | 1/1996 | Tessier ................................. | 43/16 |
| 5,533,294 | 7/1996 | Coulter ................................ | 43/15 |
| 5,722,630 | 3/1998 | Chu et al. ............................. | 248/514 |
| 5,761,844 | 6/1998 | Horschel .............................. | 43/21.2 |

*Primary Examiner*—Michael J. Carone
*Assistant Examiner*—Darren W. Ark
*Attorney, Agent, or Firm*—Joseph N. Breaux

[57] ABSTRACT

A fishing pole holder that provides a hook setting action when a tugging force caused by a striking fish is supplied to the end of the fishing rod tip of a fishing rod having a handle positioned within the rod handle holding tube of the fishing pole holder.

1 Claim, 3 Drawing Sheets

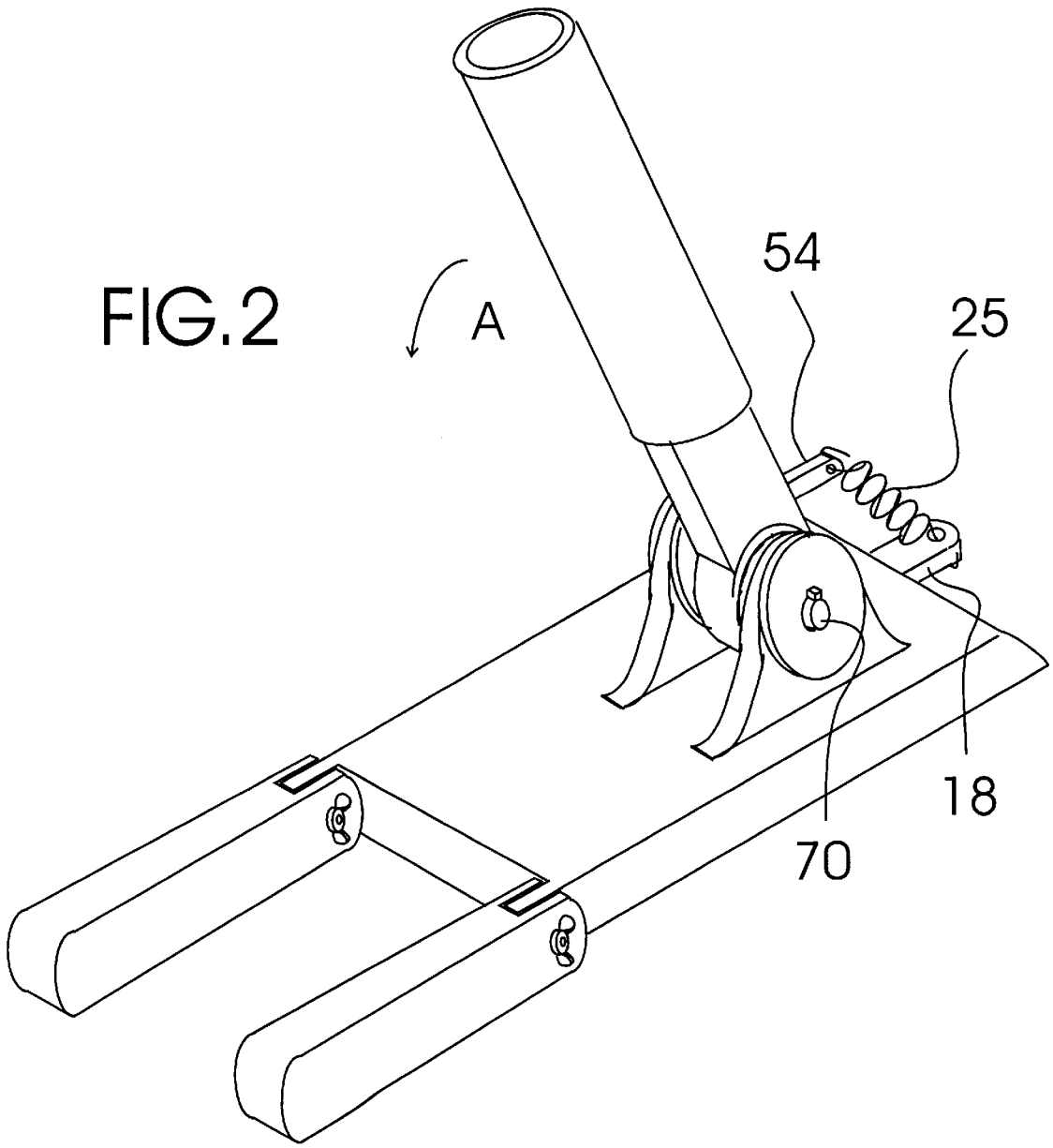

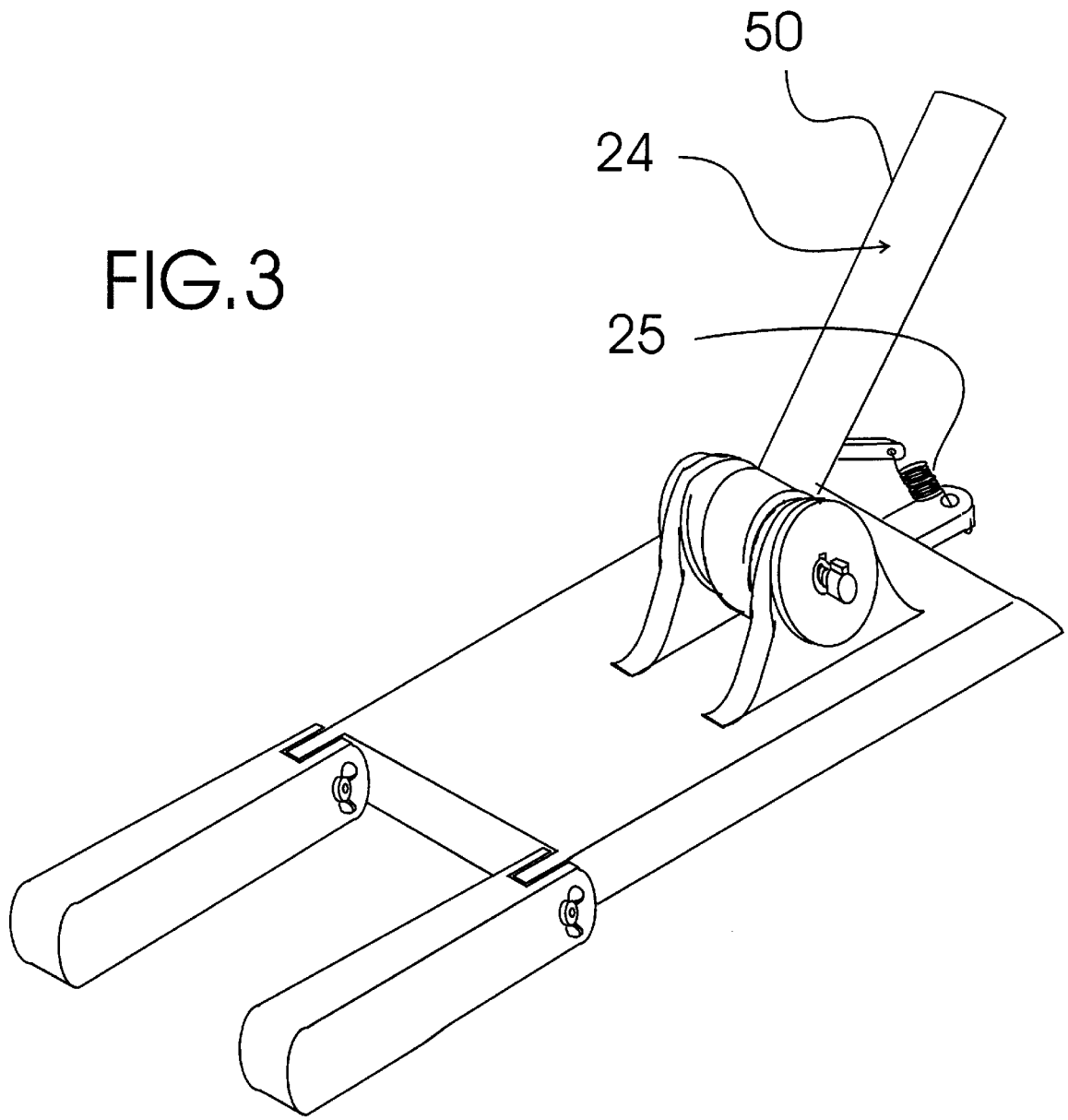

FISHING POLE HOLDER

TECHNICAL FIELD

The present invention relates to fishing pole holders and more particularly to a fishing pole holder that includes a base plate; two pivotally adjustable support legs pivotally attached to the front of the base plate with wing nut assemblies; a recoil spring attachment structure formed in connection with the back edge of the base plate; a left rod holding support extending upwardly from a top surface of the base plate and provided with a closed bottomed cylinder shaped pivot pin receiving cavity; a right rod holding support extending upwardly from the top surface of the base plate and including a locking pin passageway entirely therethrough in concentric axial alignment with the open end of the closed bottomed cylinder shaped pivot pin receiving cavity, an exterior portion of the right rod holding support adjacent to the locking pin passageway having a shift-lock tab keyway formed therein in connection with the locking pin passageway; a fishing rod handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alignable with both the locking pin passageway of the right rod holding support and the open end of the closed bottomed cylinder shaped pivot pin receiving cavity of the left rod holding support and that has a pivot portion shift-lock keyway formed in connection with the right rod holding support facing side of the rod holder pivot pin passageway; a recoil spring attached between the recoil spring attachment arm and the recoil spring attachment structure such that the recoil spring is fully extended when the pivot portion shift-lock keyway of the pivot pin receiving portion is aligned with the shift lock tab keyway of the right rod holder support; and a pivot pin having a spring biased shift-lock button having a shift-lock key provided at one end thereof that is positionable through the concentrically axially aligned rod holder pivot pin passageway, the locking pin passageway and the open end of the closed bottomed cylinder shaped pivot pin receiving cavity of the left rod holding support; the spring biased shift lock button being compressible such that a first portion of the shift lock key is in the pivot portion shift-lock keyway of the pivot pin receiving portion and a second portion is in the pivot portion shift-lock keyway of the pivot pin receiving portion when the pivot portion shift-lock keyway of the pivot pin receiving portion is aligned with the shift lock tab keyway of the right rod holder support and is held in place by a biasing force from the extended recoil spring; a force opposing the recoil spring causing the second portion of the shift lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

BACKGROUND ART

It is often desirable when fishing along beaches piers or the like to have a number of rods set in holders which are then monitored for movements indicating a fish striking the line of the rod. Although many times the fisherman retrieves the rod in time to set the hook to catch the striking fish, often times the fish is not hooked in time. It would be a benefit, therefore, to have a fish holder that could provide a hook setting action when a tugging force caused by a striking fish is supplied to the end of the fishing rod tip.

GENERAL SUMMARY DISCUSSION OF INVENTION

It is thus an object of the invention to provide a fishing pole holder that includes a base plate; two pivotally adjustable support legs pivotally attached to the front of the base plate with wing nut assemblies; a recoil spring attachment structure formed in connection with the back edge of the base plate; a left rod holding support extending upwardly from a top surface of the base plate and provided with a closed bottomed cylinder shaped pivot pin receiving cavity; a right rod holding support extending upwardly from the top surface of the base plate and including a locking pin passageway entirely therethrough in concentric axial alignment with the open end of the closed bottomed cylinder shaped pivot pin receiving cavity, an exterior portion of the right rod holding support adjacent to the locking pin passageway having a shift-lock tab keyway formed therein in connection with the locking pin passageway; a fishing rod. handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alienable with both the locking pin passageway of the right rod holding support and the open end of the closed bottomed cylinder shaped pivot pin receiving cavity of the left rod holding support and that has a pivot portion shift-lock keyway formed in connection with the right rod holding support facing side of the rod holder pivot pin passageway; a recoil spring attached between the recoil spring attachment arm and the recoil spring attachment structure such that the recoil spring is fully extended when the pivot portion shift-lock keyway of the pivot pin receiving portion is aligned with the shift lock tab keyway of the right rod holder support; and a pivot pin having a spring biased shift-lock button having a shift-lock key provided at one end thereof that is positionable through the concentrically axially aligned rod holder pivot pin passageway, the locking pin passageway and the open end of the closed bottomed cylinder shaped pivot pin receiving cavity of the left rod holding support; the spring biased shift lock button being compressible such that a first portion of the shift lock key is in the pivot portion shift-lock keyway of the pivot pin receiving portion and a second portion is in the pivot portion shift-lock keyway of the pivot pin receiving portion when the pivot portion shift-lock keyway of the pivot pin receiving portion is aligned with the shift lock tab keyway of the right rod holder support and is held in place by a biasing force from the extended recoil spring; a force opposing the recoil spring causing the second portion of the shift lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

Accordingly, a fishing pole holder is provided. The fishing pole holder includes a base plate; two pivotally adjustable support, legs pivotally attached to the front of the base plate with wing nut assemblies; a recoil spring attachment structure formed in connection with the back edge of the base plate; a left rod holding support extending upwardly from a top surface of the base plate and provided with a closed bottomed cylinder shaped pivot pin receiving cavity; a right rod holding support extending upwardly from the top surface of the base plate and including a locking pin passageway entirely therethrough in concentric axial alignment with the open end of the closed bottomed cylinder shaped pivot pin receiving cavity, an exterior portion of the right rod holding support adjacent to the locking pin passageway having a shift-lock tab keyway formed therein in connection with the locking pin passageway; a fishing rod handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alignable with both the locking pin passageway of the right rod holding support and the open end of the closed bottomed cylinder shaped pivot pin receiving cavity of the left rod holding support and that has a pivot portion shift-lock keyway formed in connection with the right rod holding support facing side of the rod holder pivot pin passageway; a recoil spring attached between the recoil spring attachment arm and the recoil spring attachment structure such that the recoil spring is fully extended when the pivot portion shift-lock keyway of the pivot pin receiving portion is aligned with the shift lock tab keyway of the right rod holder support; and a pivot pin having a spring biased shift-lock button having a shift-lock key provided at one end thereof that is positionable through the concentrically axially aligned rod holder pivot pin passageway, the locking pin passageway and the open end of the closed bottomed cylinder shaped pivot pin receiving cavity of the left rod holding support; the spring biased shift lock button being compressible such that a first portion of the shift lock key is in the pivot portion shift-lock keyway of the pivot pin receiving portion and a second portion is in the pivot portion shift-lock keyway of the pivot pin receiving portion when the pivot portion shift-lock keyway of the pivot pin receiving portion is aligned with the shift lock tab keyway of the right rod holder support and is held in place by a biasing force from the extended recoil spring; a force opposing the recoil spring causing the second portion of the shift lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a perspective view of the fishing rod holder of FIG. 1 assembled and in the cocked position with the recoil spring extended, the first portion of the shift lock key in the pivot portion shirt-lock keyway of the pivot pin receiving portion and the second portion in the pivot portion shift-lock keyway of the pivot pin receiving portion.

FIG. 3 is a perspective view of the fishing rod holder of FIG. 2 in the released position with the recoil spring unextended, and the fishing rod holder pivoted fully back.

EXEMPLARY MODE FOR CARRYING OUT THE INVENTION

Figure 1:
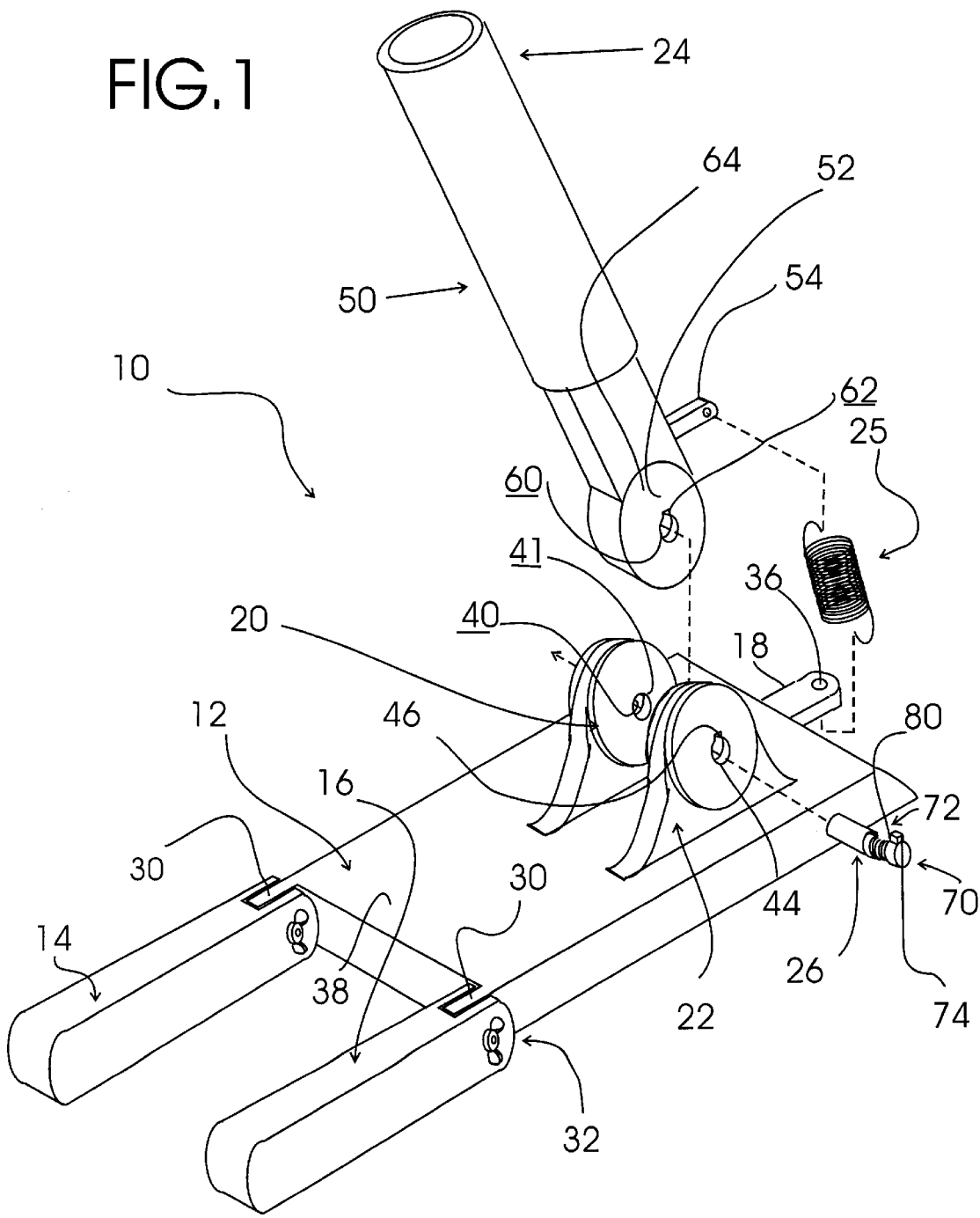
FIG. 1 is an exploded perspective view of an exemplary embodiment of the fishing pole holder of the present invention showing the base plate; the two pivotally adjustable support legs pivotally attached to the front of the base plate with wing nut assemblies; the recoil spring attachment structure formed in connection with the back edge of the base plate; the left rod holding support extending upwardly from a top surface of the base plate and provided with a closed bottomed cylinder shaped pivot pin receiving cavity; a right rod holding support extending upwardly from the top surface of the base plate and including a locking pin passageway entirely therethrough in concentric axial alignment with the open end of the closed bottomed cylinder shaped pivot pin receiving cavity, an exterior portion of the right rod holding support adjacent to the locking pin passageway having a shift-lock tab keyway formed therein in connection with the locking pin passageway; a fishing rod handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alignable with both the locking pin passageway of the right rod holding support and the open end of the closed bottomed cylinder shaped pivot pin receiving cavity of the left rod holding support and that has a pivot portion shift-lock keyway formed in connection with the right rod holding support facing side of the rod holder pivot pin passageway; a recoil spring attached between the recoil spring attachment arm and the recoil spring attachment structure such that the recoil spring is fully extended when the pivot portion shift-lock keyway of the pivot pin receiving portion is aligned with the shift lock tab keyway of the right rod holder support; and a pivot pin having a spring biased shift-lock button with the shift-lock key provided at one end thereof that is positionable through the concentrically axially aligned rod holder pivot pin passageway, the locking pin passageway and the open end of the closed bottomed cylinder shaped pivot pin receiving cavity of the left rod holding support; the spring biased shift lock button being compressible such that a first portion of the shift lock key is in the pivot portion shift-lock keyway of the pivot pin receiving portion and a second portion is in the pivot portion shift-lock keyway of the pivot pin receiving portion when the pivot portion shift-lock keyway of the pivot pin receiving portion is aligned with the shift lock tab keyway of the right rod holder support and is held in place by a biasing force from the extended recoil spring; a force opposing the recoil spring causing the second portion of the shift lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

FIG. 1 shows a partially dissassembled exemplary embodiment of the fishing pole holder of the present invention generally desginated 10. Fishing pole holder 10 includes a base plate, generally desginated 12; two pivotally adjustable support legs, generally desginated 14, 16; a recoil spring attachment structure 18; a left rod holding support, generally desginated 20; a right rod holding support, generally desginated 22; a fishing rod handle holder, generally designated 24; a recoil spring, generally designated 25; and a pivot pin, generally designated 26.

Base plate 12 is a rectangualr steel plate and has two leg attachment sections 30 to which the two pivotally adjustable support legs 14, 16 are pivotally attached with wing nut assemblies 32 (only one shown). Recoil spring attachment structure 18 is integrally formed with and extends from the back edge of base plate 12. A recoil spring end aperture 36 is provided for connecting an end of recoil spring 25 thereto.

Left rod holding support 20 is of steel construction and extends upwardly from a top surface 38 of base plate 12. Left rod holding support 20 is provided with a closed bottomed cylinder shaped pivot pin receiving cavity 40 having a circular open end 41. Right rod holding support 22 also extends upwardly from top surface 38 and is spaced apart from and oriented in parallel with left rod holding support 20. Right rod holding support 22 includes a locking pin passageway 44 formed entirely therethrough in concentric axial alignment with and facing the open end 41 of closed bottomed cylinder shaped pivot pin receiving cavity 40. A shift-lock tab keyway 46 is formed in conection with locking pin passageway 44 along the length thereof.

Fishing rod handle holder 24 includes a tubular rod handle receiving portion 50 in connection with a pivot pin receiving portion 52 having a recoil spring attachment arm 54 extending therefrom. Pivot pin receiving portion 52 is sized to fit between the left and right rod holding supports 20, 22 and includes a rod holder pivot pin passageway 60 formed entirely therethrough that is simultaneously concentrically axially alignable with both the locking pin passageway 44 of right rod holding support 22 and open end 41 of closed bottomed cylinder shaped pivot pin receiving cavity 40 of left rod holding support 20 and has a pivot portion shift-lock keyway 62 formed in connection with a right rod holding support facing side 64 of rod holder pivot pin passageway 60.

Referring to FIG. 2, recoil spring 25 is attached between recoil spring attachment arm and recoil spring attachment structure 18 such that recoil spring 25 is fully extended when, referring back to FIG. 1, pivot portion shift-lock keyway 62 is aligned with shift lock tab keyway 46. Pivot pin 26 has a spring biased shift-lock button 70 with the shift-lock key, generally desginated 72 provided at one end thereof that is positionable through the concentrically axially aligned rod holder pivot pin passageway 60, the locking pin passageway 44 and the open end 41 of the closed bottomed cylinder shaped pivot pin receiving cavity 40 to pivotally seucre fishing rod handle holder 24 to left and right rod holding supports 20, 22.

In use, rod holder 10 is cocked by pivoting fishing rod handle holder 24 until pivot portion shift-lock keyway 62 is aligned with shift lock tab keyway 46 and then depressing spring biased shift lock button 70 such that a first portion 80 of shift lock key 72 is in the pivot portion shift-lock keyway 62 of pivot pin receiving portion 52 and a second portion 74 remains in the shift lock tab keyway 46 of the right rod holder support 22. Referring to FIG. 2, shift lock key 72 is held in place by a biasing force from extended recoil spring 25. When a forward force in the direction "A" is applied opposing the recoil spring 25, shift lock button 70 is released and shift lock key 72 is forced from pivot portion shift-lock keyway 62 (FIG. 1), referring now to FIG. 3, freeing fishing rod holder 24 to rapidly recoil under spring force from recoil spring 25 to supply a hook setting action to a fishing pole having a handle positioned within the tubular rod handle receiving portion 50.

It can be seen from the preceding description that a fishing pole holder has been provided that includes a base plate; two pivotally adjustable support legs pivotally attached to the front of the base plate with wing nut assemblies; a recoil spring attachment structure formed in connection with the back edge of the base plate; a left rod holding support extending upwardly from a top surface of the base plate and provided with a closed bottomed cylinder shaped pivot pin receiving cavity; a right rod holding support extending upwardly from the top surface of the base plate and including a locking pin passageway entirely therethrough in concentric axial alignment with the open end of the closed bottomed cylinder shaped pivot pin receiving cavity, an exterior portion of the right rod holding support adjacent to the locking pin passageway having a shift-lock tab keyway formed therein in connection with the locking pin passageway; a fishing rod handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alignable with both the locking pin passageway of the right rod holding support and the open end of the closed bottomed cylinder shaped pivot pin receiving cavity of the left rod holding support and that has a pivot portion shift-lock keyway formed in connection with the right rod holding support facing side of the rod holder pivot pin passageway; a recoil spring attached between the recoil spring attachment arm and the recoil spring attachment structure such that the recoil spring is fully extended when the pivot portion shift-lock keyway of the pivot pin receiving portion is aligned with the shift lock tab keyway of the right rod holder support; and a pivot pin having a spring biased shift-lock button having a shift-lock key provided at one end thereof that is positionable through the concentrically axially aligned rod holder pivot pin passageway, the locking pin passageway and the open end of the closed bottomed cylinder shaped pivot pin receiving cavity of the left rod holding support; the spring biased shift lock button being compressible such that a first portion of the shift lock key is in the pivot portion shift-lock keyway of the pivot pin receiving portion and a second portion is in the pivot portion shift-lock keyway of the pivot pin receiving portion when the pivot portion shift-lock keyway of the pivot pin receiving portion is aligned with the shift lock tab keyway of the right rod holder support and is held in place by a biasing force from the extended recoil spring; a force opposing the recoil spring causing the second portion of the shift lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

It is noted that the embodiment of the fishing pole holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing pole holder comprising:
   a base plate;
   two pivotally adjustable support legs pivotally attached to a front of the base plate with wing nut assemblies;
   a recoil spring attachment structure formed in connection with a back edge of the base plate;

a left rod holding support extending upwardly from a top surface of the base plate and provided with a closed bottomed cylinder shaped pivot pin receiving cavity;

a right rod holding support extending upwardly from the top surface of the base plate and including a locking pin passageway entirely therethrough in concentric axial alignment with the open end of the closed bottomed cylinder shaped pivot pin receiving cavity, the right rod holding support adjacent to the locking pin passageway having a shift-lock tab keyway formed therein in connection with the locking pin passageway along the length thereof;

a fishing rod handle holder including a tubular rod handle receiving portion in connection with a pivot pin receiving portion having a recoil spring attachment arm extending therefrom and that is sized to fit between the left and right rod holding supports, the pivot pin receiving portion including a rod holder pivot pin passageway formed entirely therethrough that is simultaneously concentrically axially alignable with both the locking pin passageway of the right rod holding support and the open end of the closed bottomed cylinder shaped pivot pin receiving cavity of the left rod holding support and that has a pivot portion shift-lock keyway formed therein on a side which faces the right rod holding support;

a recoil spring attached between the recoil spring attachment arm and the recoil spring attachment structure such that the recoil spring is fully extended when the pivot portion shift-lock keyway of the pivot pin receiving portion is aligned with the shift-lock tab keyway of the right rod holder support;

a pivot pin having a spring biased shift-lock button having a shift-lock key provided at one end thereof that is positionable through the concentrically axially aligned rod holder pivot pin passageway, the locking pin passageway and the open end of the closed bottomed cylinder shaped pivot pin receiving cavity of the left rod holding support;

the spring biased shift lock button being compressible such that a first portion of the shift-lock key is in the pivot portion shift-lock keyway of the pivot pin receiving portion and a second portion is in the shift-lock tab keyway of the right rod holding support when the pivot portion shift-lock keyway of the pivot pin receiving portion is aligned with the shift-lock tab keyway of the right rod holding support and is held in place by a biasing force from the extended recoil spring; and wherein a triggering force of sufficient magnitude on the fishing rod handle holder in a direction opposing the biasing force of the recoil spring causing the first portion of the shift-lock key to be forced from the pivot portion shift-lock keyway freeing the fishing rod holder to rapidly recoil under spring force from the recoil spring to supply a hook setting action to a fishing pole having a handle positioned within the tubular rod handle receiving portion.

* * * * *